Figure 1:
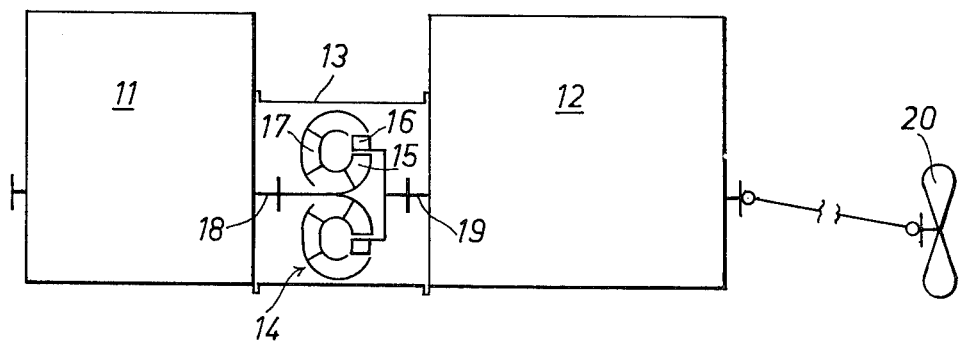

United States Patent [19]

Deutschmann

[11] 4,120,155
[45] Oct. 17, 1978

[54] PROPULSION ARRANGEMENT

[75] Inventor: Herbert Deutschmann, Friedrichshafen, Germany

[73] Assignee: Motoren- und Turbinen-Union Friedrichshafen GmbH, Germany

[21] Appl. No.: 729,181

[22] Filed: Oct. 4, 1976

[30] Foreign Application Priority Data

Oct. 11, 1975 [DE] Fed. Rep. of Germany ....... 2545665

[51] Int. Cl.² .......................... F02B 37/00; F02B 73/00
[52] U.S. Cl. ........................................ 60/599; 60/605; 60/717
[58] Field of Search ................ 60/599, 605, 606, 612, 60/698, 706, 710, 716, 717, 718; 114/270; 115/76

[56] References Cited

U.S. PATENT DOCUMENTS

| | | | |
|---|---|---|---|
| 1,152,567 | 9/1915 | Spear | 60/717 |
| 2,248,423 | 7/1941 | Buchi | 60/612 |

FOREIGN PATENT DOCUMENTS

| | | | |
|---|---|---|---|
| 254,738 | 11/1926 | United Kingdom | 60/716 |
| 420,962 | 12/1934 | United Kingdom | 60/716 |
| 547,711 | 9/1942 | United Kingdom | 60/605 |
| 571,426 | 8/1945 | United Kingdom | 60/623 |

*Primary Examiner*—Louis J. Casaregola
*Attorney, Agent, or Firm*—Craig & Antonelli

[57] ABSTRACT

A propulsion arrangement which includes two diesel engines with one of the two engines having a first compression ratio for ensuring a reliable starting and the second engine having a compression ratio that permits high supercharging and high average pressure. Each of the engines include an exhaust supercharger with surplus exhaust from the exhaust driven supercharger of the first engine being supplied to the second engine to prepare an air charge of the second engine for reliable ignition conditions in a partial load operation of the second engine. A device may be provided for heating up the air charge of the second engine at least in one of an idling and partial load operation with a temperature regulator controlling the temperature of the air charge of the second engine so as to set the temperature for the air charge such that at each rpm a final compression temperature exists in the cylinders of the second engine which is necessary for ignition in that engine. A common cooling circuit is provided for the second engine, which circuit includes a common main heat exchanger having a coolant pump driven by the first engine. An air charge cooler is associated with both the first and second engine and a supplementary heat exchanger may be provided for cooling the coolant in the circuit of the engine prior to entering the air charge cooler associated with the second engine. The engines may be arranged one behind the other with at least one of a rigid or elastic connection between the respective crank shafts of the engine, or the engines may be disposed laterally adjacent one another with a coupling being provided between the engines so as to result in a collective drive.

45 Claims, 2 Drawing Figures

PROPULSION ARRANGEMENT

The present invention relates to a propulsion arrangement and, more particularly, to a propulsion unit including two diesel engines charged by two exhaust-driven superchargers, wherein the power output, weight and volume of the diesel engines are improved without increasing the thermal and mechanical stressing of the structural parts of the respective engines.

An effective way of improving power output, weight and volume of diesel engines is realized by reducing the compression ratio of the engine while simultaneously increasing the supercharging pressure. In this way, the average pressures that are basic or necessary for engine power are increased without exceeding permissible peak pressures. A disadvantage of this approach lies in the fact that diesel engines which have correspondingly low compression ratios can not be started or run with partial load since, due to low compression temperatures, there is no ignition of the injected fuel or, at least no ignition that is adequate for acceptable combustion. To avoid this disadvantage, a corresponding precompression of the air charge to the final compression pressure and therewith the temperature has been proposed; however, it is not possible to effect such pre-compression by simple means due to the lack of adequate exhaust energy. Also, preheating of the air charge has been proposed; however, such preheating is expensive and requires several supplementary devices.

A multi-cylinder diesel engine is known, for example, in German Pat. No. 665,392, wherein one or more of the available cylinders in the engine are constructed so as to provide a sufficient compression ratio necessary to effect an ignition of the injected fuel in turning over or starting with the remaining cylinders being constructed to have a lower compression ratio. In this known construction, the diesel engine is first started with the high compression cylinders and with the air charge of the remaining low compression cylinders being heated by either the exhaust from the high compression cylinder or by a direct heating of the low compression cylinders themselves. After sufficient heating has been effected, fuel is delivered or injected to the low compression cylinders and, due to the prior heating of such cylinders, the ignition temperature is reached at the end of the compression stroke.

Several disadvantages of this known construction reside in the fact that, in addition to the different compression ratios of the two groups of cylinders, each group must have different injection conditions as well as different valve control times in order to obtain favorable operating conditions for both groups of cylinders, thereby requiring expensive special construction of the injection pumps, cams, crank shafts, and housings, since these elements must be constructed in part for operating with low compression and in part for operating with high compression. An optimal adaptation to the case of application in question, for example, varying the cylinder number used for starting and partial load drive corresponding to operating conditions, or a conversion of the total power of the diesel engine by changing the total number of cylinders is possible only with a considerable monetary outlay and considerable development of the engines. In further low compression diesel engines provided with exhaust-driven superchargers, it has been proposed to increase the pre-compression of the engine for starting and in the partial load range, by a supplementary production of exhaust in a combustion chamber. However, one disadvantage of this proposal resides in the fact that the efficiency of the diesel engine in the partial load range is naturally unfavorably affected by fuel consumption in the combustion chamber. A further disadvantage lies in the fact that considerable expenses are involved for constructing the combustion chamber, the provision of the necessary air conduits, the required regulation control devices, and the starting of the combustion chamber.

The present invention is concerned with the task of providing an acceptable drive from low compression diesel engines especially in starting, idling and partial load, while eliminating the afore-mentioned shortcomings.

The underlying problems are solved in accordance with the present invention by providing two diesel engines charged by exhaust-driven superchargers with the first diesel engine having a compression ratio of $\epsilon \geq 12$ for ensuring reliable starting with the exhaust driven supercharger, fuel injection and load change of this engine being designed for optimal partial load operation, with the second engine having a compression ratio of $\epsilon \leq 12$, thereby allowing high supercharging and high average pressures, whereby its associated exhaust driven supercharger is capable of delivering the necessary high supercharging pressure at full load operation with surplus exhaust not needed for charging the first engine being supplied to the second engine to prepare the air charge of the second engine, thereby ensuring the existence of reliable ignition conditions in partial load operation of the second engine.

By virtue of the above construction of the present invention, two main drive ranges, starting with partial load, and a drive with maximum power, are thereby associated respectively to an engine particularly designed for such loads and, for example, a series engine can be used for starting with partial load operation, which engine is equipped with different numbers of cylinders corresponding to the specific conditions of use with such series engines being readily taken from a standard engine manufacturing line.

Furthermore, according to the present invention, the low compression diesel can be designed specifically for full load operation with reference to its charge, injection conditions, load shifts, and thermal and mechanical stresses, whereby at this operational point of the low compression diesel engine, it is possible to realize very favorable power output, weights and relative small dimensions.

Also, according to the invention, the modification of the installed power can be effected in both engines by simply changing the number of cylinders, thereby allowing economical manufacture of two engines which may have twelve cylinders or more since normally the series program of diesel engine manufacturers consists of engines having six, eight or twelve cylinders. Therefore, the use of such engines affords a cost advantage due to the available combination of these available engines. However, sixteen, eighteen or twenty cylinders per engine are also available in limited quantities, and such engines may also be employed in combination with each other or in combination with the normal series engines.

In many applications of an engine arrangement such as provided by the present invention, a single engine with six cylinders can be provided for the first engine and, since this number of cylinders is frequently used for single engines, the manufacturing costs are favorable by virtue of the large number of six cylinder engines in production.

According to a further feature of the present invention, exhaust energy or heat in the exhaust gas downstream of its exhaust-driven supercharger which is not necessary for charging the first engine may be utilized to directly or indirectly warm up the air charge of the second engine in its idling or partial load operation.

According to still another feature of the present invention, means are provided for regulating the temperature of the air charge of the second engine so that such regulator sets a temperature for the air charge such that, at each rmp, there will be a final compression temperature in the cylinder that is necessary for ignition.

Also, in accordance with the present invention, the exhaust or air charge surplus from the first engine may be used for supplementary charging of the second engine when such engine idles or is in a partial load operation.

A quick warm up and hence favorable operating condition for the second engine in the partial load operation of the first engine is realized in accordance with the present invention by providing a common cooling circuit with a common main heat exchanger having a water pump advantageously driven by the first engine.

According to yet a further advantageous feature of the present invention which secures a fast warming up of the propulsion unit when it is cold, an effective cooling of the propulsion unit working at full load, and a supply of necessary exhaust energy resides in providing the first engine with a single stage exhaust-driven supercharger and an air charge cooler disposed in the adjacent flow of the coolant water of the engine, with the second engine being provided with a double or two-stage supercharger unit and with a supplementary heat-exchanger for further cooling of the coolant water prior to its entrance into an air charge cooler.

Additionally, according to the present invention, the two diesel engines may be disposed one behind the other with the two crank shafts being rigidly connected to each other, connected elastically in rotation, or connected by a switchable coupling.

Additionally, the propulsion unit of the present invention may be advantageously used for ship propulsions with a hydrodynamic torque converter being interposed between the two diesel engines with the pump wheel of the torque converter being connected with the crank shaft of the first engine and the turbine wheel being connected to the crank shaft of the second engine.

Furthermore, according to an additional advantageous feature of the present invention, an intermediate housing means may be provided for connecting the two diesel engines.

Also, in accordance with the present invention, it is possible to dispose the two diesel engines next to each other and interconnect such diesel engines by a switchable coupling or torque converter with a collective drive.

It is also possible in accordance with the present invention to utilize the first engine as a drive or onboard assembly of a ship and for starting the second engine with the second engine serving for propulsion of the ship.

To produce different compressions in the respective engines, according to the present invention, the control and drive parts of the two diesel engines may correspond with the different compressions being attached by differing the dimensions of the pistons and/or cylinders; i.e., changing the piston length with the same cylinder dimensions or altering the cylinder length with the same piston dimensions. Alternatively, the first engine may be provided having cylinders which have a cylinder proportion differing from that of the second engine.

Accordingly, it is an object of the present invention to provide a propulsion unit which avoids by simple means the afore-mentioned shortcomings and drawbacks encountered in the prior art.

A further object of the present invention resides in providing a propulsion unit which ensures a sufficient drive from low compression diesel engines, especially in starting, idling and partial load.

A further object of the present invention resides in providing a propulsion unit which reduces the thermal and mechanical stressing of the structural parts of such unit.

A still further object of the present invention resides in providing a propulsion unit which provides an adequate power output while reducing the weight and volume of the structural parts of the propulsion unit and also reducing the manufacturing costs.

Figure 2:
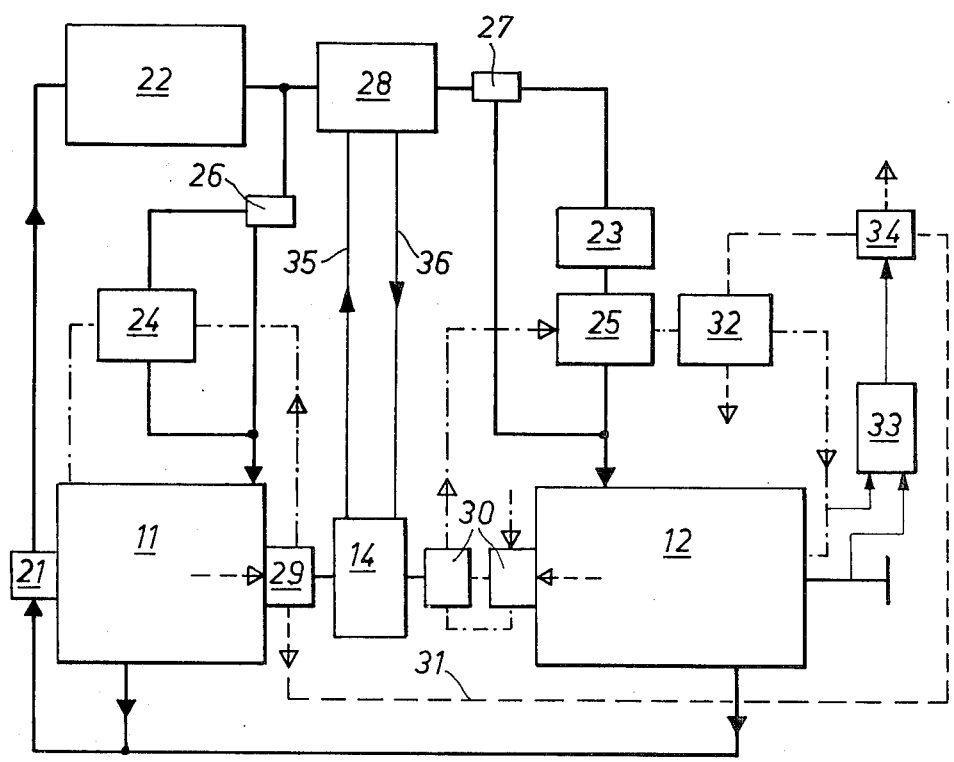

These and further objects, features and advantages of the present invention will become more apparent from the following description when taken in connection with the accompanying drawing which shows, for the purposes of illustration only, one embodiment in accordance with the present invention, and wherein:

FIG. 1 is a schematic representation of a propulsion unit in accordance with the present invention utilized as a propulsion unit for a ship; and FIG. 2 is a schematic representation of the cooling circuit of the propulsion unit of FIG. 1 in accordance with the present invention.

Referring now to the drawings, wherein like reference numerals are used throughout both views to designate like parts, and more particularly to FIG. 1, according to this figure, an intermediate housing 13 is provided for interconnecting the housing of the first diesel engine 11 having a compression ratio of $\epsilon \leq 12$ with the housing of a second diesel engine 12 having a compression ratio of $\epsilon \leq 12$. By virtue of the provision of an intermediate housing 13, a precise coaxial alignment of the two engines is eliminated. A hydrodynamic torque converter 14 is interposed between the engines 11,12 with a pump wheel 15 of the converter 14 being connected to a crank shaft 18 of the first diesel engine and with the turbine wheel 16 of the converter 14 being connected to a crank shaft 19 of the second diesel engine 12.

The first diesel engine 11 has, for example, six cylinders and, consequently, can be taken from a standard engine production line. The second diesel engine 12 has a large number of cylinders corresponding to the desired power demand for propulsion and, for example, the second engine may be provided with twelve cylinders. By a high supercharging, high average pressures are produced in the second diesel engine 12 and, consequently, a high power output is realized as contrasted to that of an ordinary engine. However, the high output power taken in conjunction with the lower compression ratio $\epsilon \leq 12$ results in no increase in thermal and mechanical stresses of the structural parts of the engines 11,12.

To utilize the engine construction as a propulsion unit for a ship or boat, a screw propeller 20 is provided with the first diesel engine 11 serving for propulsion with partial load, for driving onboard assemblies (not shown) provided on the ship, and for warm-up and starting of the second diesel engine 12. Additionally, any surplus power of the first engine 11 can readily be switched over without difficulty to the output of the second engine for propulsion of the ship.

As shown in FIG. 2, the propulsion unit of the present invention includes a common cooling circuit indicated in solid line, which circuit includes a coolant pump 21, driven by engine 11, providing for the circulation of a coolant liquid. A main heat exchanger 22 through which, for example, sea water flows, and a supplementary air charge heat exchanger 23 are provided in the cooling circuit for taking up and carrying off the heat in the coolant. In operation of the engines, heat is given off by way of air charge coolers 24,25 from the air charge (indicated in dot-and-dash line) to the coolant liquid. The amount of coolant liquid, for example, water, passing through the air charge coolers 24,25 is controlled by thermostatic valves 26,27. Heat losses from the torque converter 14 are given off to the coolant liquid through oil conduits 35,36 by way of an oil-water heat exchanger 28.

The diesel engine 11 is provided with a single-stage exhaust driven supercharger 29, whereas the diesel engine 12 is provided with a two-stage exhaust driven supercharger 30. Surplus exhaust from diesel engine 11 is taken downstream of the exhaust driven supercharger 29 in a conduit 31 to a supplementary heat exchanger 32 for heating the air charge of the diesel engine 12. A regulator 33 adjusts the temperature of the air charge by way of an exhaust valve 34 as a function of the rpm of the engine 11 so that the final compression temperature in the cylinders necessary for ignition is readily attained.

In operation of the propulsion unit, the diesel engine 11 is first started and, due to its high compression, a reliable start is assured. The operation of the engine 11 drives the pump 21, thereby ensuring an adequate coolant circulation. When the coolant is cold, the thermostatic valves 26,27 by-pass the flow of coolant to the air charge coolers 24,25 and heat exchanger 23. If used as a propulsion unit in a ship, the diesel engine 11 provides an output sufficient to meet the power requirements of the onboard assemblies, or the output of the engine 11 can be drawn on for propulsion of the ship at a partial load. Under a partial load operation, the diesel engine 11 drives the screw propeller 20 by way of the torque converter 14 and second diesel engine 12. The torque converter 14 effecting adaptation of the available engine power to the power requirement of the screw propeller 20 plus the power requirement for turning over the second diesel engine 12 without supplying any additional fuel to the engine 12.

The coolant is quickly warmed by the heat from the first diesel engine 11 and torque converter 14 and therewith diesel engine 12 through which the coolant flows. To further accelerate the warming of the coolant, the inflow of sea water to the main heat exchanger 22 may be blocked by a suitable conventional valve (not shown). Since the first diesel engine 11 is driven with full load or almost full load, the exhaust driven supercharger 29 fully takes over the charging and any surplus exhaust from the supercharger 29 is fed through a conduit 31 and an exhaust valve 34 to the heat exchanger 32 to heat up the air charge of the second diesel engine 12. This heating of the air charge of the second diesel engine 12 is sufficient to meet the starting conditions of the engine 12 so that delivery of fuel to this engine can then be effected. After the start of the second diesel engine 12, with increased heating of the propulsion unit due to the operation of the engine 12, the engine 12 delivers the total propulsion power.

Upon the starting and operation of the second engine 12, it is then charged by its two-stage exhaust driven supercharger 30. By emptying the torque converter 14 in a known manner, the first diesel engine 11 can then be separated from the propulsion unit; however, the diesel engine 11 can also be selectively switched on again in phases of high power demand by filling the torque converter 14. With still increased heating of the propulsion unit due to the operation of the engines 11 and/or 12, the exhaust valve 34 is opened more by way of the regulator 33 so that the heating up of the air charge for the diesel engine 12 diminishes and, finally, the thermostatic valve 27 opens so that the flow of coolant is led through the air charge heat exchanger 23 and air charge cooler 25, thereby cooling the air charge of the diesel engine 12.

While I have shown and described only one embodiment in accordance with the present invention, it is understood that the same is not limited thereto, but is susceptible of numerous changes and modifications as known to those skilled in the art, and I therefor do not wish to be limited to the details shown and described herein, but intend to cover all such changes and modifications as are encompassed by the scope of the appended claims.

I claim:

1. A propulsion arrangement including two diesel engines, characterized in that the first of the two engines has means for producing a predetermined compression ratio which ensures a reliable starting, the first engine includes an exhaust gas-driven supercharger means and fuel injection means for providing an optimal partial load operation of the engine, and in that the second of the two engines has means for producing a predetermined compression ratio lower than the ratio of the first of the two engines, which lower ratio permits high supercharging and high average pressures, the second engine includes an exhaust-driven supercharger means for delivering high supercharging pressure in full load operation of the second engine, and in that means are provided for supplying surplus exhaust from the first engine to the second engine to prepare an air charge of the second engine for reliable ignition conditions in partial load operation of the second engine.

2. An arrangement according to claim 1, characterized in that means are provided for heating the air charge of the second engine in at least one of an idling and partial load operation, and in that said supplying means extend from a position downstream of the exhaust driven supercharger means of the first engine to said air charge heating means so as to supply exhaust heat thereto.

3. An arrangement according to claim 2, characterized in that means are provided for regulating the temperature of the air charge of the second engine in at least one of an idling and partial load operation, said temperature regulating means setting a temperature for the air charge such that, at each rpm, a final compression temperature exists in cylinders of the second engine that is necessary for ignition.

4. An arrangement according to claim 3, characterized in that the first engine has a predetermined high compression ratio which is greater than 12 and the second engine has a lower compression ratio which is less than 12, said compression ratios always being different for each engine during operation.

5. An arrangement according to claim 1, characterized in that a means is provided for supplementary charging of the second engine at least during one of an idling and partial load operation.

6. An arrangement according to claim 5, characterized in that a common cooling means is provided for the first and second engine including a common main heat exchanger means having a coolant pump means, and in that means are provided for drivingly connecting the first engine to the coolant pump means.

7. An arrangement according to claim 6, characterized in that the exhaust gas driven supercharger means of the first engine is a single-stage exhaust-driven supercharger, an air charge cooler means is associated with the first engine, and in that means are provided for directing a flow of hot air from the single-stage exhaust-driven supercharge to said air charge cooler means.

8. An arrangement according to claim 7, characterized in that the exhaust gas driven supercharger means of the second engine is a two-stage exhaust-driven supercharger, an air charge cooler means is associated with the second engine, a supplementary heat exchanger means for further cooling the coolant prior to entering the air charge cooler means of the second engine, and in that means are provided for directing a flow of hot air from the second stage of the two-stage exhaust-driven supercharger to said air charge cooler means of the second engine.

9. An arrangement according to claim 8, characterized in that the first and second engines are arranged one behind the other, and in that each of the engines includes a crank shaft, and means are provided for connecting the respective crank shafts in rotation.

10. An arrangement according to claim 9, characterized in that the connecting means are rigid connecting elements.

11. An arrangement according to claim 9, characterized in that the connecting means are elastic connecting elements.

12. An arrangement according to claim 9, characterized in that the connecting means are fashioned as a switchable coupling means.

13. An arrangement according to claim 9, characterized in that the propulsion arrangement is arranged in a ship and forms the propulsion unit therefor, a hydrodynamic torque converter means is interposed between the first and second engine and includes a pump wheel means and a turbine wheel means, the pump wheel means is connected with the crank shaft means of the first engine and the turbine wheel means is connected with the crank shaft of the second engine.

14. An arrangement according to claim 13, characterized in that each engine is arranged in a housing means, and in that an intermediate housing means is provided for connecting the housing means of the engines so as to form a single housing unit.

15. An arrangement according to claim 13, characterized in that the ship includes onboard assemblies, and in that the first engine is operatively connected with the onboard assemblies for driving the same.

16. An arrangement according to claim 15, characterized in that the first engine is employed to start the second engine.

17. An arrangement according to claim 16, characterized in that at least one screw means is provided for propelling the ship, and in that the second engine is operatively connected with said screw means so as to drive the same.

18. An arrangement according to claim 17, characterized in that each engine includes control means and drive parts, and in that the control means and drive parts of each engine correspond to each other.

19. An arrangement according to claim 18, characterized in that the predetermined compression ratios of the first and second engine are achieved by the respective engines with piston-cylinder arrangements having different dimensions.

20. An arrangement according to claim 18, characterized in that the first engine has a cylinder proportion which differs from a cylinder proportion of the second engine.

21. An arrangement according to claim 5, characterized in that the first and second engines are disposed laterally adjacent one another, and in that means are provided for connecting the first and second engines so as to provide a collective drive.

22. An arrangement according to claim 21, characterized in that the means for connecting the first and second engine is a selectively switchable coupling.

23. An arrangement according to claim 21, characterized in that the means for connecting the first and second engine is a hydrodynamic torque converter means.

24. An arrangement according to claim 1, characterized in that a common cooling means is provided for the first and second engine including a common main heat exchanger means having a coolant pump means, and in that means are provided for drivingly connecting the first engine to the coolant pump means.

25. An arrangement according to claim 24, characterized in that the exhaust gas driven supercharger means of the first engine is a single-stage exhaust-driven supercharger, an air charge cooler means is associated with the first engine, and in that means are provided for directing a flow of hot air from the single-stage exhaust-driven supercharger to said air charge cooler means.

26. An arrangement according to claim 25, characterized in that the exhaust gas driven supercharger means of the second engine is a two-stage exhaust-driven supercharger, an air charge cooler means is associated with the second engine, a supplementary heat exchanger means for further cooling the coolant prior to entering the air charge cooler means of the second engine, and in that means are provided for directing a flow of hot air from the second stage of the two-stage exhaust-driven supercharger to said air charge cooler means of the second engine.

27. An arrangement according to claim 26, characterized in that the first and second engines are arranged one behind the other, and in that each of the engines includes a crank shaft, and means are provided for connecting the respective crank shafts in rotation.

28. An arrangement according to claim 27, characterized in that the connecting means are rigid connecting elements.

29. An arrangement according to claim 27, characterized in that the connecting means are elastic connecting elements.

30. An arrangement according to claim 27, characterized in that the connecting means are fashioned as a switchable coupling means.

31. An arrangement according to claim 1, characterized in that the propulsion arrangement is arranged in a ship and forms the propulsion unit therefor, a hydrodynamic torque converter means is interposed between the first engine and second engine and includes a pump wheel means and a turbine wheel means, and in that the pump wheel means is connected with a crank shaft means of the first engine and the turbine wheel means is connected with a crank shaft means of the second engine.

32. An arrangement according to claim 31, characterized in that each engine is arranged in a housing means, and in that an intermediate housing means is provided for connecting the housing means of the engines so as to form a single housing unit.

33. An arrangement according to claim 32, characterized in that the ship includes onboard assemblies, and in that the first engine is operatively connected with the onboard assemblies for driving the same.

34. An arrangement according to claim 33, characterized in that the first engine is employed to start the second engine.

35. An arrangement according to claim 34, characterized in that at least one screw means is provided for propelling the ship, and in that the second engine is operatively connected with said screw means so as to drive the same.

36. An arrangement according to claim 1, characterized in that means are provided for regulating the temperature of the air charge of the second engine in at least one of an idling and partial load operation, said temperature regulating means setting a temperature for the air charge such that, at each rpm, a final compression temperature exists in cylinders of the second engine that is necessary for ignition.

37. An arrangement according to claim 1, characterized in that the first and second engines are arranged one behind the other, and in that each of the engines includes a crank shaft, and means are provided for connecting the respective crank shafts in rotation.

38. An arrangement according to claim 37, characterized in that the connecting means are rigid connecting elements.

39. An arrangement according to claim 37, characterized in that the connecting means are elastic connecting elements.

40. An arrangement according to claim 37, characterized in that the connecting means are fashioned as a switchable coupling means.

41. An arrangement according to claim 1, characterized in that the first and second engines are disposed laterally adjacent one another, and in that means are provided for connecting the first and second engines so as to provide a collective drive.

42. An arrangement according to claim 40, characterized in that the means for connecting the first and second engine is a selectively switchable coupling.

43. An arrangement according to claim 40, characterized in that the means for connecting the first and second engine is a hydrodynamic torque converter means.

44. An arrangement according to claim 1, characterized in that the predetermined compression ratios of the first and second engine are achieved by providing the respective engines with piston-cylinder arrangements having different dimensions.

45. An arrangement according to claim 1, characterized in that the first engine has a cylinder proportion which differs from a cylinder proportion of the second engine.

* * * * *